United States Patent
Stachel et al.

(10) Patent No.: US 10,814,986 B2
(45) Date of Patent: Oct. 27, 2020

(54) AIRCRAFT SEAT DEVICE INCLUDING FORCE TRANSFERRING CARRIER ELEMENT

(71) Applicant: RECARO Aircraft Seating GmbH & Co. KG, Schwaebisch Hall (DE)

(72) Inventors: Alfons Stachel, Rosengarten (DE); Klaus Steinmeyer, Rosengarten (DE); Zoltan Jussli, Bretzfeld (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 16/064,500

(22) PCT Filed: Dec. 14, 2016

(86) PCT No.: PCT/EP2016/081030
§ 371 (c)(1),
(2) Date: Jul. 16, 2018

(87) PCT Pub. No.: WO2017/108537
PCT Pub. Date: Jun. 29, 2017

(65) Prior Publication Data
US 2019/0002106 A1    Jan. 3, 2019

(30) Foreign Application Priority Data
Dec. 23, 2015 (DE) .................. 10 2015 122 830

(51) Int. Cl.
*B64D 11/06* (2006.01)
*B60N 2/68* (2006.01)
(Continued)

(52) U.S. Cl.
CPC ............ *B64D 11/064* (2014.12); *A47C 7/563* (2013.01); *A47C 7/566* (2013.01); *A47C 7/60* (2013.01);
(Continued)

(58) Field of Classification Search
CPC ......................... B64D 11/064; B64D 11/0648
See application file for complete search history.

(56) References Cited

U.S. PATENT DOCUMENTS 3,224,808 A    12/1965 Spielman
3,357,736 A    12/1967 McCarthy
(Continued)

FOREIGN PATENT DOCUMENTS

DE    10 2009 014 720 A1    9/2010
DE    10 2012 208 721 A1    11/2013
GB    2 437 164 A    10/2007

OTHER PUBLICATIONS

Search Report dated Oct. 19, 2016 issued in corresponding DE patent application No. 10 2015 122 830.0 (and partial English translation).
(Continued)

*Primary Examiner* — David R Dunn
*Assistant Examiner* — Tania Abraham
(74) *Attorney, Agent, or Firm* — Posz Law Group, PLC (57) ABSTRACT

An aircraft seat device includes at least one seat bottom unit, a mounting unit, and at least one carrier element. The at least one seat bottom unit at least partly implements a seat surface. The at least one carrier element couples the seat bottom unit with the mounting unit and transfers force from the seat bottom unit to the mounting unit.

13 Claims, 6 Drawing Sheets

(51) Int. Cl.
*A47C 7/56* (2006.01)
*A47C 7/60* (2006.01)

(52) U.S. Cl.
CPC .............. *B60N 2/68* (2013.01); *B60N 2/682* (2013.01); *B60N 2/686* (2013.01); *B64D 11/0648* (2014.12); *Y02T 50/46* (2013.01)

(56) References Cited

U.S. PATENT DOCUMENTS

| | | | |
|---|---|---|---|
| 5,366,269 A | 11/1994 | Beauvais | |
| 5,788,183 A * | 8/1998 | Marechal | B60N 2/34 244/118.6 |
| 6,402,244 B1 | 6/2002 | Schonenberg et al. | |
| 6,669,143 B1 * | 12/2003 | Johnson | B64D 11/06 244/118.6 |
| 2003/0025371 A1 * | 2/2003 | Veneruso | B60N 2/0232 297/322 |
| 2003/0094840 A1 | 5/2003 | Williamson | |
| 2009/0015047 A1 * | 1/2009 | Baumann | B60N 2/2209 297/300.2 |
| 2010/0253129 A1 * | 10/2010 | Dowty | B64D 11/064 297/85 M |
| 2010/0308167 A1 * | 12/2010 | Hawkins | B60N 2/181 244/122 R |
| 2011/0148167 A1 | 6/2011 | Westerink et al. | |
| 2012/0091780 A1 | 4/2012 | Mueller | |
| 2012/0139302 A1 | 6/2012 | Estevenin et al. | |
| 2013/0099538 A1 * | 4/2013 | Jussli | B60N 2/22 297/313 |
| 2014/0175849 A1 * | 6/2014 | Berti | B64D 11/06 297/340 |
| 2015/0151840 A1 | 6/2015 | Thomaschewski | |

OTHER PUBLICATIONS

International Search Report of the International Searching Authority dated Mar. 24, 2017 issued in corresponding International patent application No. PCT/EP2016/081030.
International Preliminary Report on Patentability dated Jun. 26, 2018 issued in corresponding International patent application No. PCT/EP2016/081030.
Office Action dated Dec. 19, 2019 issued in corresponding EP patent application No. 16 819 847.1 (and English translation).

* cited by examiner

AIRCRAFT SEAT DEVICE INCLUDING FORCE TRANSFERRING CARRIER ELEMENT

CROSS REFERENCE TO RELATED APPLICATIONS

This application is a U.S. national stage application of PCT/EP2016/081030 filed on Dec. 14, 2016, which is based on German Patent Application No. 10 2015 122 830.0 filed on Dec. 23, 2015, the contents of which are incorporated herein by reference.

STATE OF THE ART

The invention concerns an aircraft seat device.

Aircraft seat devices have already been proposed.

The objective of the invention is in particular to provide a generic device having improved characteristics regarding weight and comfort as defined by the claims.

Advantages of the Invention

According to the invention, an aircraft seat device is proposed with at least one seat bottom unit, which at least partly implements a seat surface, with a mounting unit, which is configured to be mounted on a mounting plane, and with at least one carrier element, which extends at least over a large portion of a seat depth of the seat surface and is configured for coupling the seat bottom unit with the mounting unit. By an "aircraft seat device" is herein in particular a device to be understood which implements at least a portion or an entire aircraft seat. By an "aircraft seat" is herein in particular a seat to be understood which is mounted in an aircraft cabin of an aircraft. An aircraft seat herein preferably comprises at least a seat bottom unit, a backrest unit, a mounting unit and/or at least one armrest unit. Herein the aircraft seat is preferably embodied as part of a plurality of aircraft seats which are arranged side by side. By a "seat bottom unit" is herein in particular a unit to be understood which implements a sitting region for a passenger, the seat bottom unit being preferably embodied by a base body and a cushion that is attached on the base body. By a "sitting region" is herein in particular a region of the seat to be understood which is configured for a passenger to sit on it, in particular during transport, for example during a flight. Herein the base body of the seat bottom unit is preferably made of a fiber composite material. By a "mounting unit" is herein in particular a unit to be understood by means of which an aircraft seat is mounted on a mounting plane of the aircraft cabin. The mounting unit herein preferably comprises at least a front seat foot, a rear seat foot and transverse supports which are coupled with the seat feet and extend in a transverse direction of the aircraft seat. Principally it is here also conceivable that the mounting unit comprises only one single transverse support. By a "carrier element" is herein in particular an element to be understood via which forces may be transferred from the seat bottom unit and/or the backrest unit into the mounting unit of the aircraft seat. Here a carrier element is in particular implemented of a rigid material and is coupled with a front transverse support as well as with a rear transverse support of the mounting unit. The carrier element is here preferably connected to the transverse supports in a torque-proof and axially fixed manner. For this purpose the at least one carrier element is fixedly connectable to the transverse supports via a form-fit and/or force-fit connection. Principally it is also conceivable that the at least one carrier element is connected to the transverse supports by substance-to-substance bond. Preferentially the aircraft seat comprises two carrier elements, via which the seat bottom unit of the aircraft seat is coupled with the mounting unit. If the aircraft seat is embodied as part of a seat row with a plurality of aircraft seats, it is advantageously conceivable that a carrier element that is arranged between neighboring aircraft seats is configured for a connection at least of the seat bottom units of the two aircraft seats. A "seat depth of the seat surface" is herein in particular to mean an extension of the seat bottom unit in a seat direction of the seat bottom unit. The seat depth is herein measured from a front end of the seat bottom unit, embodying a front end of the aircraft seat, to a rear end, on which the seat bottom unit is coupled with the backrest unit. A "large portion of the seat depth" is herein in particular to mean at least more than 50% of the entire seat depth, preferably at least 75% of the entire seat depth and, in an especially advantageous implementation, more than 90% of the entire seat depth. By a "backrest unit" is herein in particular a unit of the aircraft seat to be understood that forms a backrest support surface, which a passenger sitting on the aircraft seat may rest his back against. The backrest unit herein preferably comprises at least a base body and a cushion element implementing the backrest support surface. The backrest unit is herein arranged on a rear end of a seat bottom unit and extends from the seat bottom unit upwards, away from a mounting unit. The base body of the backrest unit is herein preferentially made of a fiber composite material. It is herein conceivable that the base body of the backrest unit and the base body of the seat bottom unit are implemented integrally with one another. "Configured" is in particular to mean specifically designed and/or equipped. By an object being configured for a certain function is in particular to be understood that the object fulfills and/or carries out said certain function in at least one application state and/or operating state. By an implementation according to the invention it is advantageously possible to provide an aircraft seat which is manufacturable in a particularly simple and cost-efficient fashion.

It is further proposed that in at least one seat position the at least one carrier element is arranged at least substantially underneath an upper edge of the seat bottom unit. By a "sitting position" is herein in particular a position of the aircraft seat to be understood in which the aircraft seat is completely mounted and a passenger may sit on the seat bottom unit of the aircraft seat. By an "upper edge of the seat bottom unit" is herein in particular an edge of the seat bottom unit to be understood, having a farthest distance from a mounting plane which the aircraft seat, of which the seat bottom unit is a part, is mounted on. Herein an upper edge of the seat bottom unit is in particular to be understood as a front edge of the seat bottom unit, in particular of a seat cushion. Herein, in particular in a TTL position of the aircraft seat, the carrier element is arranged underneath the upper edge of the seat bottom unit. This allows implementing the aircraft seat in a particularly advantageous compact manner.

Furthermore it is proposed that the aircraft seat device comprises a backrest unit, which is at least partially implemented integrally with the seat bottom unit. By "at least partially . . . integrally" is herein in particular to be understood that at least portions of the backrest unit and of the seat bottom unit are embodied of the same structural component and are in particular together implemented of at least one fiber composite layer. This allows providing an especially advantageous seat device.

It is also proposed that, in at least one sitting position, the at least one carrier element is covered topwards by the set bottom unit. "Covered from above" is herein in particular to mean that the carrier elements are arranged directly below the seat bottom unit and do not protrude beyond the seat bottom unit sideways. This allows arranging the at least one carrier element on the aircraft seat in an advantageously space-saving fashion.

It is moreover proposed that the seat bottom unit and/or a backrest unit are/is configured to be pivotally connected to the mounting unit. The seat bottom unit and the backrest unit are herein supported around a shared pivot point. "Pivotally connected to the mounting unit" is herein in particular to mean that elements, like in particular the seat bottom unit and/or the backrest unit, are supported in such a way that they are pivotal relative at least to a portion of the mounting unit. "Pivotally supported" is herein in particular to mean supported rotatably with respect to one another around a pivot axis by a defined pivot angle. This allows providing a recline function for the aircraft seat in an advantageously simple fashion.

It is further proposed that the seat bottom unit and/or a backrest unit are/is configured to be pivotally supported on the at least one carrier element. "Pivotally supported on the carrier element" is herein in particular to mean that the seat bottom unit and/or the backrest unit are/is directly connected to the at least one carrier element via a suitable support module. In this way the seat bottom unit and/or the backrest unit are/is especially simply implementable for the purpose of providing a recline function of the aircraft seat.

Beyond this it is proposed that the aircraft seat device comprises at least one support module, which is configured for pivoting the seat bottom unit and/or the backrest unit relative to the seat dividers, implementing for this purpose a pivot axis that is arranged underneath the seat bottom unit. By a "support module" is herein in particular a module to be understood via which at least two elements, like in particular the seat bottom unit and/or the backrest unit, are supported movably, in particular pivotally, with respect to the at least one support module. The support module is herein preferably embodied as a slide bearing. Principally it is also conceivable that the support module comprises a roller bearing or a plurality of roller bearings, via which the elements are configured to be pivotal relative to one another. Principally it is also conceivable that the seat bottom unit and/or the backrest unit are/is pivotally supported via a fixed, flexurally rigid but rotationally elastic torsion bar, the torsion bar effecting the pivoting via torsion. This allows implementing the recline function of the aircraft seat in a particularly advantageous manner.

It is further proposed that the pivot axis of the support module is aligned coaxially to a transverse direction of the mounting unit. By a "pivot axis of the support module" is herein in particular an axis to be understood around which the elements which are supported pivotally relative to each other by the support module, like in particular the at least one carrier element and the seat bottom unit and/or the backrest unit, are pivotal relative to one another. By a "transverse direction" of the mounting unit is herein in particular a direction to be understood which runs in parallel to the transverse supports of the mounting unit. The transverse direction is herein preferentially oriented orthogonally to the seat direction and to a vertical direction that is perpendicular to the mounting plane. This allows implementing the support module in an especially advantageous manner.

Moreover it is proposed that the support module comprises at least one torsion element, implementing the pivot axis of the seat and extending over a seat width of the seat bottom unit. By a "torsion element" is herein in particular an element to be understood which is configured to forward torsional moments, for the purpose of transferring in particular a movement from one end to another end. The torsion element is herein preferably embodied as a torsion tube or as a torsion element. By a "torsion bar" is herein in particular a flexurally rigid, torsionally elastic bar to be understood which is configured to be elastically twisted, in case of a torsional load, at least by a certain angle. By a "torsion tube" is herein a tube to be understood which is substantially torsionally rigid, which is substantially not twisted in case of a torsion load and which forwards a torsional moment substantially without loss. This allows implementing the support module in a particularly advantageous fashion.

It is also proposed that the aircraft seat device comprises at least one locking module, which is at least in a sitting position configured for locking the seat bottom unit and/or the backrest unit. By a "locking module" is herein in particular a module to be understood which fixates two elements with respect to one another at least in an operating state. The locking module is herein in particular configured to fixate the seat bottom unit and/or the backrest unit with respect to the mounting unit in at least one seat position. In this way the seat bottom unit and/or the backrest unit are fixatable in at least one seat position. "Locking" is herein in particular to mean firmly fixating in a position. A "seat position" is herein in particular to mean an orientation of the seat bottom unit and/or the backrest unit relative to the mounting plane. The aircraft seat herein comprises at least one seat position that is implemented as a TTL position and comprises a position that is implemented as a comfort position. The TTL position is herein realized as a position of the aircraft seat which must be taken in a takeoff phase, a landing phase and a turbulence phase of a flight. The TTL position is embodied as a taxi position, takeoff position or landing position. Herein the TTL position is implemented as an upright seat position, in which the sitting region of the seat bottom unit is oriented substantially parallel to the mounting plane, and the backrest surface of the backrest unit is oriented substantially orthogonally to the mounting plane. This allows advantageous locking of the aircraft seat in at least one seat position.

Furthermore it is proposed that the locking module comprises at least one locking element, which locks the seat bottom unit only in a seat position that is embodied as a TTL position. In this way it is possible to provide an advantageously simple locking module as well as an advantageous securing of the aircraft seat, in particular in the TTL position.

It is further proposed that the aircraft seat device comprises a support module, which pivotally couples the at least one carrier element directly with a rear transverse support. "Coupling directly" is herein in particular to mean that a support of the carrier element is effected directly on the transverse support. In this way an advantageously simple aircraft seat device is achievable.

The aircraft seat device according to the invention is herein not to be restricted to the application and implementation described above. In particular, to fulfill a functionality that is described here, the aircraft seat device may comprise a number of respective elements, structural components and units that differs from the number given here.

DRAWINGS

Further advantages will become apparent from the following description of the drawings. The drawings show five exemplary embodiments of the invention. The drawings, the description and the claims contain a plurality of features in combination. Someone skilled in the art will purposefully also consider the features separately and will find further expedient combinations.

It is shown in.

DESCRIPTION OF THE EXEMPLARY EMBODIMENTS

FIGS. 1 to 6 show a first exemplary embodiment of an aircraft seat device according to the invention. The aircraft seat device is part of an aircraft seat 10a. The aircraft seat 10a is configured to be mounted in an aircraft cabin of an aircraft. A cabin floor of the aircraft cabin herein realizes a mounting plane, which the aircraft seat 10a is mounted on. The aircraft seat 10a is herein part of a seat row 12a implemented by a plurality of aircraft seats 10a, 60a, 62a. The seat row 12a comprises three aircraft seats 10a, 60a, 62a, which are arranged side by side. Principally it is also conceivable that the seat row 12a comprises a different number of aircraft seats 10a, 60a, 62a. In the aircraft cabin, a plurality of seat rows with the aircraft seat device according to the invention are arranged, which are not shown in detail. The further seat rows are herein arranged in the passenger cabin in a layout that is neither shown nor described in detail, preferably in parallel behind one another. The aircraft seat 10a comprises a mounting unit 14a. The mounting unit 14a is configured for mounting the aircraft seat 10a on the cabin floor of the aircraft cabin. The mounting unit 14a comprises two front seat feet 16a, 18a and two rear seat feet 20a, 22a. On their lower ends, the seat feet 16a, 18a, 20a, 22a are each fixedly coupled with guide rails (not shown in detail) of the aircraft cabin via connection elements, which are not shown in detail either. The guide rails are herein preferentially inserted in the cabin floor. The mounting unit 14a comprises two transverse supports 24a, 26a. The two transverse supports 24a, 26a are embodied as transverse tubes. The transverse supports 24a, 26a have a ring-shaped cross-section. The first transverse support 24a is herein embodied as a front transverse support 24a. The front transverse support 24a is connected to the front seat feet 16a, 18a. Herein the front seat feet 16a, 18a are each rigidly connected to the front transverse support 24a. The second transverse support 26a is embodied as a rear transverse support 26a. The rear transverse support 26a is connected to the rear seat feet 20a, 22a. The rear seat feet 20a, 22a are each connected to the rear transverse support 26a in a rigid and torque-proof manner. The seat feet 16a, 18a, 20a, 22a are each connected to the corresponding transverse support 24a, 26a via coupling points (not described in detail) via a force-fit and/or form-fit connection and/or via substance-to-substance bond. The transverse supports 24a, 26a extend in a transverse direction of the aircraft seats 10a of the seat row 12a. The transverse supports 24a, 26a herein extend over the entire width of the seat row 12a. On an aisle-side end of the seat row 12a the aircraft seat device comprises a step element 164a. The step element 164a is embodied as a steward step. The step element 164a herein implements an elevated step for a person. The step element 164a is herein connected to the mounting unit 14a. Herein the step element 164a is plugged on the transverse supports 24a, 26a. The step element 164a is made of a metal, like in particular an aluminum. Principally it is also conceivable that the step element 164a is made of a fiber composite material.

The aircraft seat device comprises a seat bottom unit 28a. The seat bottom unit 28a is configured to implement a seat surface 30a for a passenger. A passenger may sit on the seat surface 30a that is implemented by the seat bottom unit 28a. The seat bottom unit 28a is herein connected to the mounting unit 14a. The seat bottom unit 28a comprises a base body 32a. The base body 32a of the seat bottom unit 28a comprises a thin-walled rear wall 34a. The thin-walled rear wall 34a is implemented of a fiber composite material. Herein the rear wall 34a is realized by a shaped CFRP panel. Principally it is also conceivable that the rear wall 34a is made of a different fiber composite material that is deemed expedient by someone skilled in the art. The thin-walled rear wall 34a closes the seat bottom unit 28a bottomwards. The thin-walled rear wall 34a of the base body 32a of the seat bottom unit 28a herein faces towards the mounting unit 14a that is arranged underneath the seat bottom unit 28a. The seat bottom unit 28a comprises a thin-walled front wall 36a. The thin-walled front wall 36a is connected to the thin-walled rear wall 34a of the seat bottom unit 28a. The thin-walled front wall 36a is made of a fiber composite material. The thin-walled front wall 36a is herein realized of a same material as the thin-walled rear wall 34a. The thin-walled front wall 36a is arranged on an upper side of the seat bottom unit 28a. The thin-walled front wall 36a of the seat bottom unit 28a faces upwards. The thin-walled front wall 36a of the seat bottom unit 28a implements the seat surface 30a. The thin-walled rear wall 34a and the thin-walled front wall 36a of the seat bottom unit 28a are connected to one another. Herein the thin-walled front wall 36a and the thin-walled rear wall 34a are connected to one another by substance-to-substance bond. The seat bottom unit 28a comprises a stiffening element (not shown), which is configured for stiffening the seat bottom unit 28a. For this purpose the stiffening element is arranged between the thin-walled rear wall 34a and the thin-walled front wall 36a of the seat bottom unit 28*a*. The stiffening element is embodied as a foam core. Principally it is also conceivable that the seat bottom unit 28*a* comprises no stiffening element or a differently implemented stiffening element. Herein the thin-walled front wall 36*a* and/or the thin-walled rear wall 34*a* could principally also be made of pre-fabricated organo-sheets. By "organo-sheets" are herein semi-finished fiber-matrix products to be understood, comprising reinforcing fibers pre-inserted in a synthetic matrix. The seat bottom unit 28*a* comprises a comfort element 38*a*. The comfort element 38*a* is configured to embody the seat surface 30*a*. For this purpose the comfort element 38*a* is fixedly connected on an upward-facing exterior side of the thin-walled front wall 36*a* of the seat bottom unit 28*a*. The comfort element 38*a* is herein implemented by a cushion and a cover that is releasably connected to the cushion. The comfort element is herein connected to the thin-walled front wall 36*a* via connection elements, which are not shown in detail.

Figure 1:
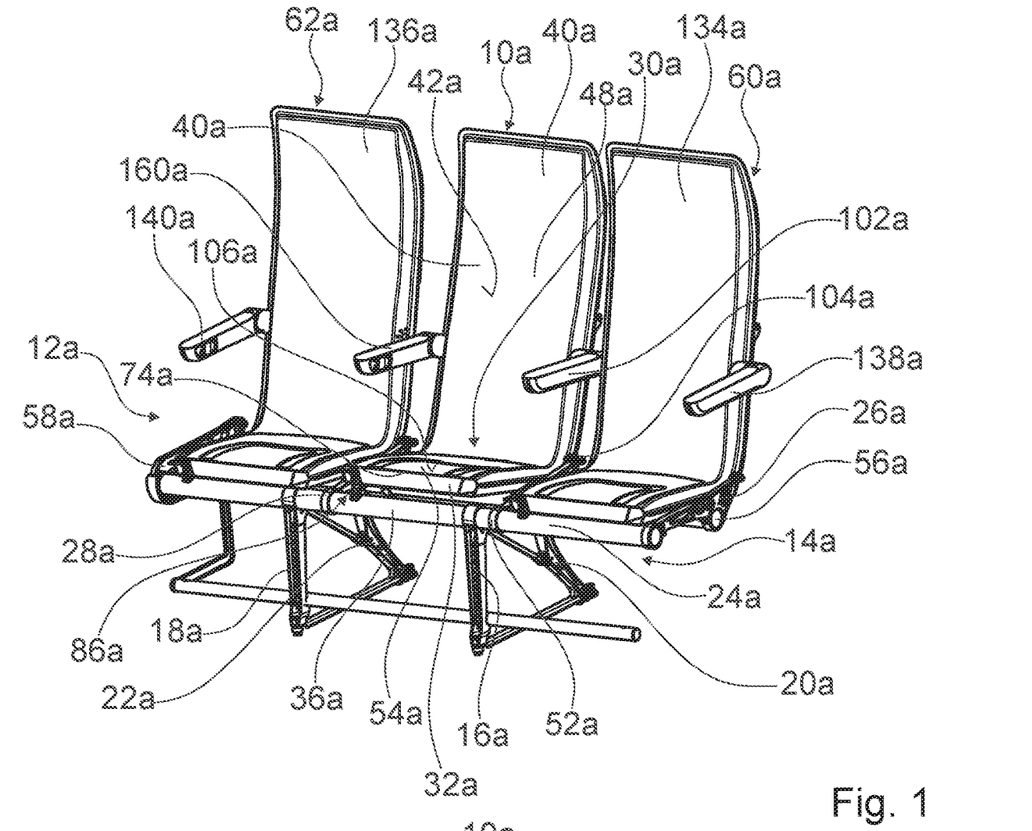
FIG. 1 a schematic representation of an aircraft seat device according to the invention, in a first exemplary embodiment, with a seat row, FIG. 2 a schematic lateral view of the aircraft seat device according to the invention, with an aircraft seat in a TTL position and in an indicated comfort position, FIG. 3 a detail view of the aircraft seat device, in particular a carrier element and a seat bottom unit, FIG. 4 a detail view of a locking unit, FIG. 5 a schematic sectional view through a seat bottom unit, FIG. 6 a schematic representation of a seat bottom unit and a backrest unit with possible pivot points, FIG. 7 a schematic representation of an aircraft seat device according to the invention, in a second exemplary embodiment, FIG. 8 a schematic representation of the seat bottom unit and parts of a mounting unit, from below, FIG. 9 a schematic representation of the aircraft seat device of the second exemplary embodiment, with a seat row having three aircraft seats, FIG. 10 a schematic representation of an aircraft seat device according to the invention, in a third exemplary embodiment.
Figure 2:
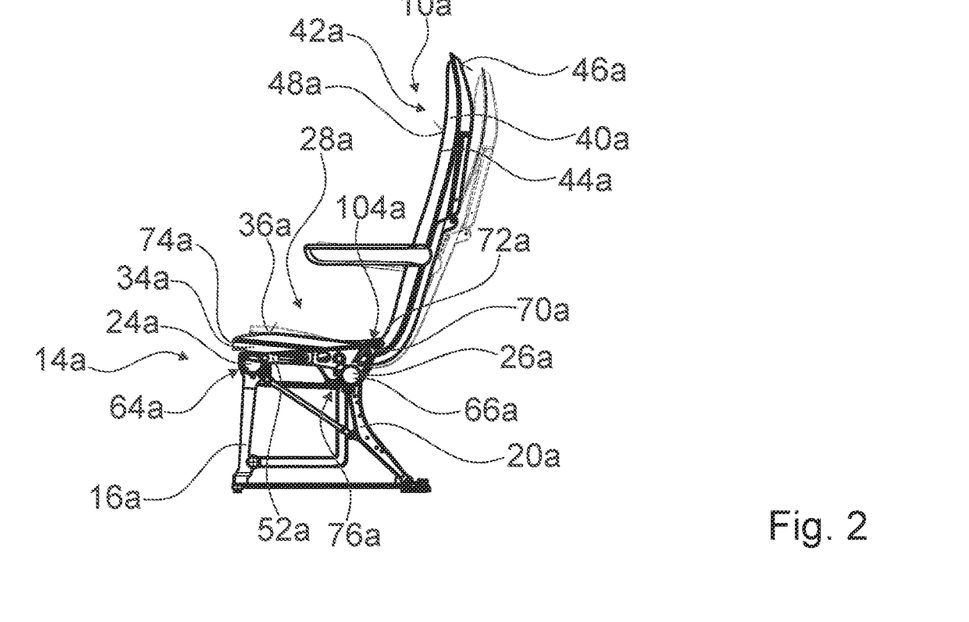

The aircraft seat device comprises a backrest unit 40*a*. The backrest unit 40*a* is configured to provide a backrest support surface 42*a*, which a passenger sitting on the aircraft seat 10*a* may rest his back against. The backrest unit 40*a* is herein arranged on a rear end of the aircraft seat 10*a*. The backrest unit 40*a* is herein arranged on a rear end of the seat bottom unit 28*a*. The backrest unit 40*a* comprises a base body 44*a*. The base body 44*a* comprises a thin-walled rear wall 46*a*. The thin-walled rear wall 46*a* is implemented of a fiber composite material. Herein the rear wall 46*a* is implemented of a shaped CFRP panel. Principally it is also conceivable that the rear wall 46*a* is implemented of a different fiber composite material that is deemed expedient by someone skilled in the art. The thin-walled rear wall 46*a* closes the backrest unit 40*a* rearwards. The rear wall 46*a* of the backrest unit 40*a* herein faces towards a region which is arranged behind the aircraft seat device and in which there is preferably another seat row arranged. On an exterior side facing away from the aircraft seat 10*a* rearwards, the rear wall 46*a* is coated with a coating (not shown nor designated in detail). The coating is configured for a scratch-proof implementation of the exterior side of the rear wall 46*a*. The thin-walled rear wall 46*a* is embodied as a visible design element. For this purpose the thin-walled rear wall 46*a*, which is embodied as a visible design element, is in particular visible from behind in a completely assembled state of the aircraft seat 10*a*. Herein the thin-walled rear wall 46*a*, which is embodied as a visible design element, closes the backrest unit 40*a* rearwards. The base body 44*a* of the backrest unit 40*a* comprises a thin-walled front wall 48*a*. The thin-walled front wall 48*a* is connected to the thin-walled rear wall 46*a*. The thin-walled front wall 48*a* is implemented of a fiber composite material. The thin-walled front wall 48*a* is herein embodied substantially of a same material as the thin-walled rear wall 46*a*. The thin-walled front wall 48*a* is arranged on a front side of the backrest unit 40*a*. Viewed in a seat direction, the thin-walled front wall 48*a* is arranged in front of the thin-walled rear wall 46*a*. The thin-walled rear wall 46*a* and the thin-walled front wall 48*a* of the backrest unit 40*a* are connected to one another. Herein the thin-walled front wall 48*a* and the thin-walled rear wall 46*a* are connected to one another by substance-to-substance bond. Principally it is also conceivable that the thin-walled front wall 48*a* and the thin-walled rear wall 46*a* are subsequently connected to one another fixedly in their connection regions by a suitable form-fit connection and/or force-fit connection and/or substance-to-substance bond. The backrest unit 40*a* comprises a stiffening element (not shown in detail), which is configured for stiffening the backrest unit 40*a*. For this purpose the stiffening element is arranged between the thin-walled rear wall 46*a* and the thin-walled front wall 48*a*, and is embodied as a foam core. The stiffening element is embodied of a foam-like material. In a production procedure, the stiffening element, which is embodied as a foam core, is herein inserted and glued between the thin-walled rear wall 46*a* and the thin-walled front wall 48*a* as an insert, before the thin-walled rear wall 46*a* and the thin-walled front wall 48*a* are fixedly connected to one another. Herein the thin-walled front wall 48*a* and/or the thin-walled rear wall 46*a* may principally be implemented of pre-fabricated organo-sheets. The aircraft seat device comprises a comfort element 50*a*. The comfort element 50*a* is configured to implement the backrest support surface 42*a*. For this purpose the comfort element 50*a* is fixedly connected on an exterior side of the thin-walled front wall 48*a*. The comfort element 50*a* is embodied by a cushion and a cover stretching over the cushion. In an assembled state, the cushion and the cover of the comfort element 50*a* constitute a unit. Principally it is also conceivable that the base body 44*a* of the backrest unit 40*a* is embodied at least partly of a magnesium. It is herein in particular conceivable that the base body 44*a* is implemented of a high-pressure die-cast magnesium.

The base body 32*a* of the seat bottom unit 28*a* and the base body 44*a* of the backrest unit 40*a* are embodied integrally with one another. Herein in particular the front wall 36*a* of the base body 32*a* of the seat bottom unit 28*a* and the front wall 48*a* of the base body 44*a* of the backrest unit 40*a* as well as the rear wall 34*a* of the base body 32*a* of the seat bottom unit 28*a* and the rear wall 46*a* of the base body 44*a* of the backrest unit 40*a* are embodied integrally with one another. The front wall 36*a* of the base body 32*a* of the seat bottom unit 28*a* and the front wall 48*a* of the base body 44*a* of the backrest unit 40*a* are implemented of a layer or a plurality of layers of fiber composite panels. The rear wall 34*a* of the base body 32*a* of the seat bottom unit 28*a* and the rear wall 46*a* of the base body 44*a* of the backrest unit 40*a* are also implemented of a layer or a plurality of layers of fiber composite panels. It is herein conceivable that both the front walls 36*a*, 48*a* as well as the rear walls 34*a*, 46*a* are implemented of layers of different fiber composite material, e.g. of CFRP and GFRP.

Figure 3:
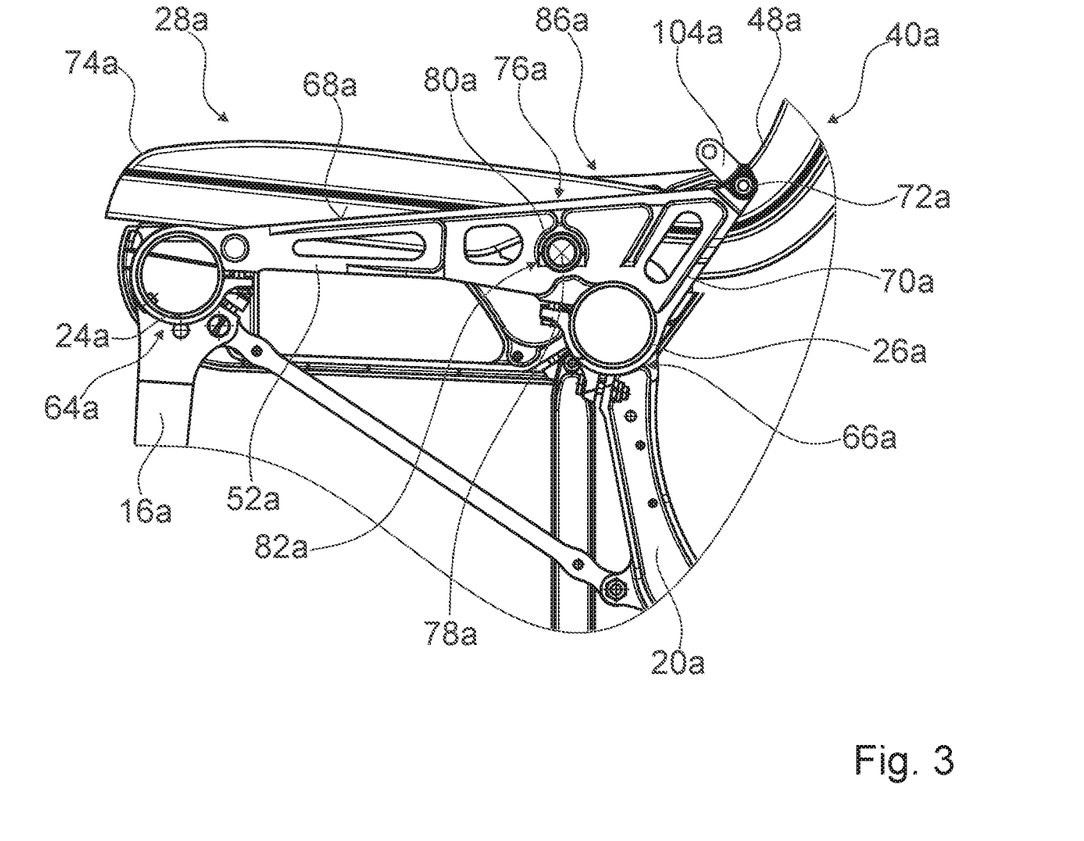

The aircraft seat device comprises a carrier element 52*a* and a second carrier element 54*a*, which are allocated to the aircraft seat 10*a*. The two carrier elements 52*a*, 54*a* are configured to couple the seat bottom unit 28*a* and the backrest unit 40*a* with the mounting unit 14*a*. For a connection of the two further aircraft seats 60*a*, 62*a*, the e aircraft seat device comprises two further carrier elements 56*a*, 58*a*. Herein respectively one of the further carrier elements 56*a*, 58*a* together with one of the carrier elements 52*a*, 54*a*, is configured for a connection of one of the aircraft seats 60*a*, 62*a*. The carrier elements 52*a*, 54*a*, 56*a*, 58*a* are herein embodied identically. Principally it is also conceivable that the carrier elements 52*a*, 54*a*, 56*a*, 58*a* are at least partially embodied differently and may have partially differing functions. In the following only the carrier elements 52*a*, 54*a* of the first aircraft seat 10*a* will be described in detail. For an explanation of the further carrier elements 56*a*, 58*a* the following description of the other carrier elements 52*a*, 54*a* may be referred to.

The carrier elements 52*a*, 54*a* are herein implemented as plate-shaped elements. The carrier elements 52*a*, 54*a* have a substantially constant thickness. Through holes, which are not described in detail and are configured for a weight reduction of the carrier elements 52*a*, 54*a*, are introduced in the carrier elements 52a, 54a. The carrier elements 52a, 54a are herein implemented of an aluminum. Principally it is also conceivable that the carrier elements 52a, 54a are implemented of a different material like, for example, a different light metal, like in particular a magnesium, a titanium or, for example, of a fiber composite material. The carrier elements 52a, 54a extend over a large portion of a seat depth of the seat surface 30a of the seat bottom unit 28a. The seat depth herein extends from a front end of the seat bottom unit 28a to a rear end of the seat bottom unit 28a, which the backrest unit 40a is arranged on. The carrier elements 52a, 54a are herein arranged spaced apart from each other in a transverse direction. The carrier elements 52a, 54a herein have a distance from each other that is approximately equivalent to a width of the seat bottom unit 28a. The carrier elements 52a, 54a are each connected to the front transverse support 24a and the rear transverse support 26a. Herein the carrier elements 52a, 54a are respectively connected to the corresponding transverse support 24a, 26a rigidly. The carrier elements 52a, 54a are herein arranged in such a way that they are axially fixated on the transverse supports 24a, 26a. For the purpose of a connection with the transverse supports 24a, 26a, the carrier elements 52a, 54a each comprise a front connection region 64a and a rear connection region 66a. Via the front connection region 64a the carrier elements 52a, 54a are respectively connected to the front transverse support 24a. Via the rear connection region 66a the carrier elements 52a, 54a are respectively connected to the rear transverse support 26a. In the connection regions 64a, 66a the carrier elements 52a, 54a encompass the respective transverse support 24a, 26a. In a region between the two transverse supports 24a, 26a, the carrier elements 52a, 54a comprise an upper edge 68a extending substantially parallel to the mounting plane. The carrier elements 52a, 54a slightly taper towards the front transverse support 24a. A lower edge of the carrier elements 52a, 54a is herein respectively inclined to the corresponding upper edge 68a. The upper edge 68a of the carrier elements 52a, 54a is herein situated above the transverse supports 24a, 26a. In a region of the rear transverse support 26a, the carrier elements 52a, 54a extend with their end regions 70a upwards, away from the transverse supports 24a, 26a. The rear end region 70a herein approximately implements a triangular shape. On a rear end, the end region 70a implements an accommodation hole 72a. The end region 70a herein ends approximately in a transition region between the seat bottom unit 28a and the backrest unit 40a.

The carrier elements 52a, 54a are configured to couple the seat bottom unit 28a with the mounting unit 14a. Via the carrier elements 52a, 54a, the backrest unit 40a is also coupled with the mounting unit 14a. The carrier elements 52a, 54a are herein arranged underneath the seat bottom unit 28a. Herein the carrier elements 52a, 54a are in particular arranged below an upper edge 74a of the seat bottom unit 28a.

Figure 6:
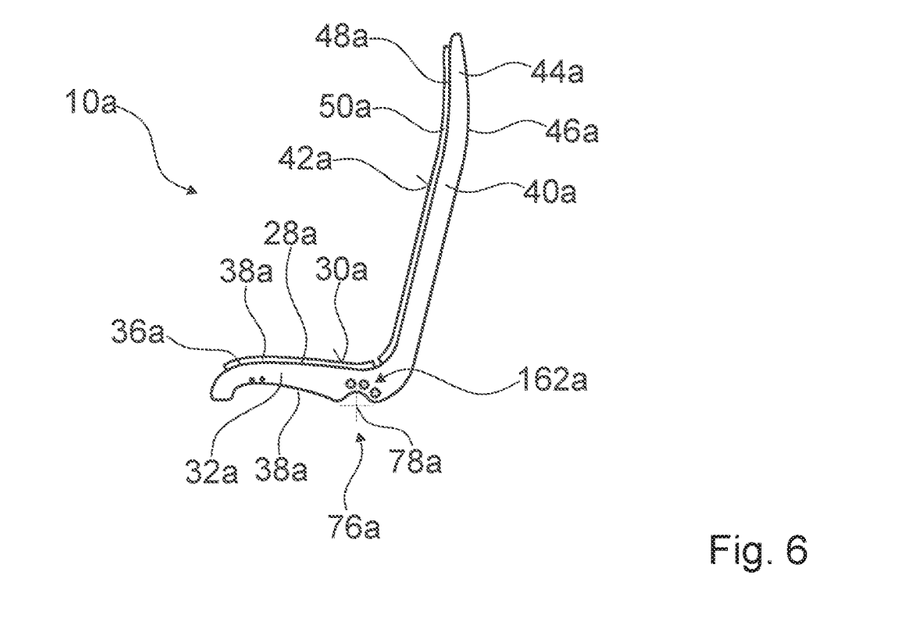

The seat bottom unit 28a and the backrest unit 40a are configured to be pivotally connected to the mounting unit 14a. By the pivotal support of the seat bottom unit 28a and of the backrest unit 40a, it is possible to bring the aircraft seat 10a into a TTL position and into a comfort position. Principally it would also be conceivable that the aircraft seat 10a is pivotal into further seat positions by way of the pivotal support. For the purpose of pivotally supporting the seat bottom unit 28a and the backrest unit 40a, the aircraft seat device comprises a support module 76a. The support module 76a is embodied as a pivot bearing. The support module 76a implements a pivot axis 78a, via which the seat bottom unit 28a and the backrest unit 40a are pivotal relative to the mounting unit 14a. The pivot axis 78a implements a pivot point around which the seat bottom unit 28a and the backrest unit 40a are jointly pivotable. The pivot axis 78a is herein arranged underneath the seat bottom unit 28a. The pivot axis 78a of the support module 76a is aligned coaxially to a transverse direction of the mounting unit 14a. A pivoting of the seat bottom unit 28a and the backrest unit 40a is herein effected around a point situated underneath the seat bottom unit 28a. In this way a particularly advantageous pivoting of the seat bottom unit 28a and the backrest unit 40a is achievable. Viewed in the seat direction, the pivot axis 78a is herein arranged in front of the rear transverse support 26a. Principally it is herein conceivable that the pivot axis 78a of the support module 76a is located in different positions 162a of the seat bottom unit 28a and/or of the backrest unit 40a. For this FIG. 6 schematically shows positions 162a, in which the pivot axis 78a of the support module 76a may be located in the seat bottom unit 28a and/or the backrest unit 40a.

Figure 5:
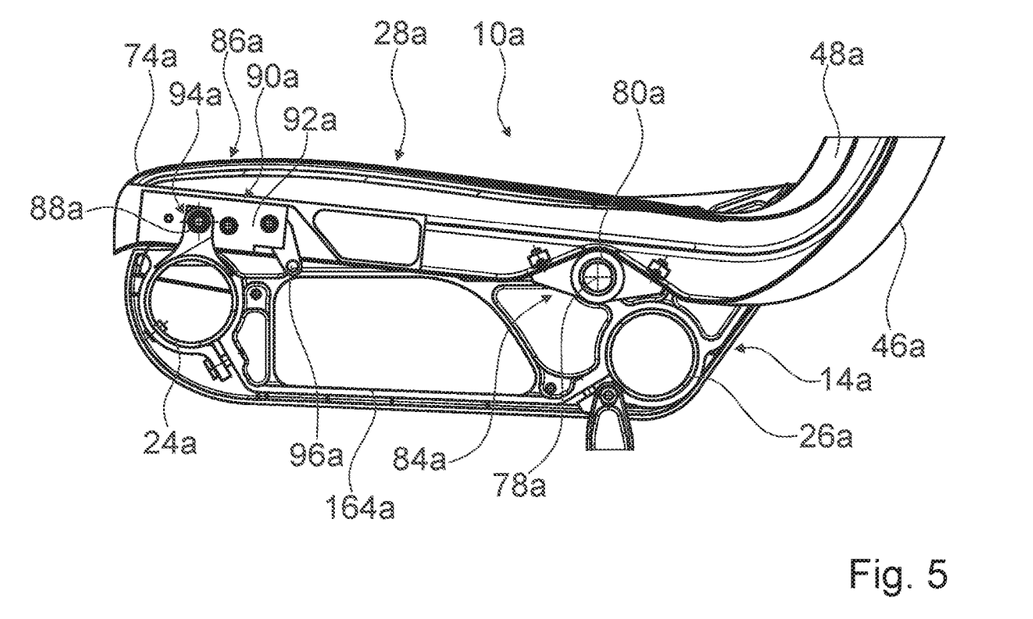

The support module 76a comprises a torsion element 80a. The torsion element 80a is embodied as a torsion tube. The torsion element 80a embodies the pivot axis 78a. The torsion element 80a is arranged between the carrier elements 52a, 54a in such a way that it is twistable. The torsion element 80a extends over a seat width of the seat bottom unit 28a. The torsion element 80a is connected to the mounting unit 14a via the carrier elements 52a, 54a. The seat bottom unit 28a and the backrest unit 40a are connected to the mounting unit 14a via the torsion element 80a. For this purpose the carrier elements 52a, 54a each comprise a bearing accommodation 82a. The bearing accommodations 82a are embodied as slide bearings. Principally it is also conceivable that roller bearings are arranged in the bearing accommodations 82a. The torsion element 80a extends from the one carrier element 52a to the other carrier element 54a. The support module 76a comprises two connection elements 84a. The connection elements 84a are configured to couple the seat bottom unit 28a with the torsion element 80a. Principally it is also conceivable that the torsion element 80a is laminated into the seat bottom unit 28a or is embodied directly of CFRP and/or GFRP layers. The connection elements 84a are fixedly connected on an underside of the seat bottom unit 28a. For this purpose the connection elements 84a are rigidly connected to the seat bottom unit 28a via connection elements, which are not shown in detail. It is herein conceivable that the connection elements are embodied as screw elements or as any other kind of form-fit and/or force-fit elements which are deemed expedient by someone skilled in the art. Principally it is, for example, also conceivable that the connection elements 84a are connected to the seat bottom unit 28a by substance-to-substance bond or that the connection elements 84a are implemented integrally with the seat bottom unit 28a. The connection elements 84a are arranged spaced apart from each other. Herein one of the connection elements 84a is arranged on a side facing towards the one carrier element 52a and one of the connection elements 84a is arranged on the side facing towards the carrier element 54a. The torsion element 80a is connected to the connection elements 84a in a torque-proof fashion. Via the connection between the torsion element 80a and the connection elements 84a forces are transferable in an axial as well as in a circumferential direction. Via the torsion element 80a, the seat bottom unit 28a, and thus the aircraft seat 10a, is twistable between its TTL position and its comfort position. In the TTL position the seat bottom unit 28a is aligned substantially parallel to the mounting plane.

The TTL position constitutes an upright seat position of the aircraft seat 10a. In the TTL position the seat bottom unit 28a rests upon portions of the carrier elements 52a, 54a with support surfaces which are located on the underside of the seat bottom unit 28a. This allows, in the TTL position, forces being easily and advantageously introduced from the seat bottom unit 28a into the carrier elements 52a, 54a and thus into the mounting unit 14a. In the comfort position the seat bottom unit 28a and the backrest unit 40a are pivoted around the pivot axis 78a rearwards counter to the seat direction. The seat bottom unit 28a and the backrest unit 40a are herein pivoted rearwards by three degrees. Principally it is also conceivable that, in the comfort position, the seat bottom unit 28a and the backrest unit 40a are pivoted by a different angle deemed expedient by someone skilled in the art, e.g. five degrees or eight degrees. The aircraft seat device comprises a stop (not shown in detail), which the seat bottom unit 28a and/or the backrest unit 40a abut on in the comfort position, thus delimiting a pivot angle of the seat bottom unit 28a and the backrest unit 40a. The stop is herein arranged on the mounting unit 14a or on the carrier elements 52a, 54a.

Figure 4:
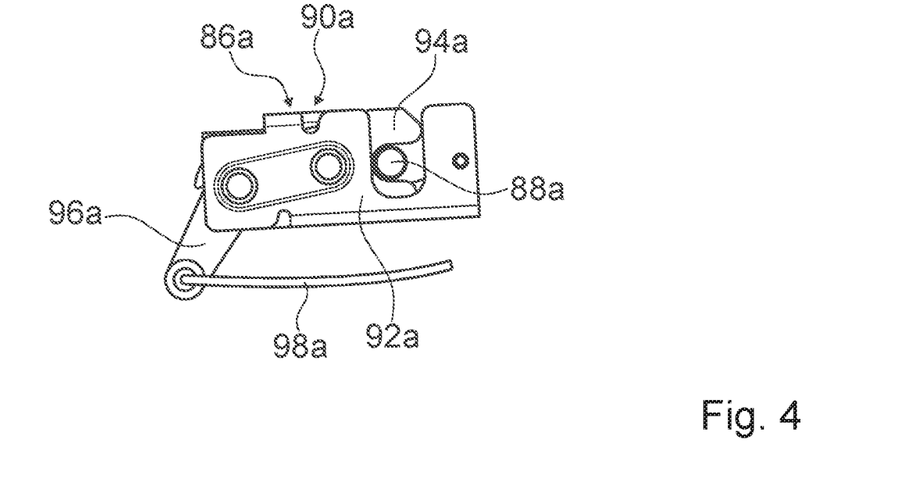

For the purpose of locking the seat bottom unit 28a and the backrest unit 40a, the aircraft seat device comprises a locking module 86a. The locking module 86a is configured to lock the seat bottom unit 28a and the backrest unit 40a in a seat position. The locking module 86a fixes the seat bottom unit 28a and the backrest unit 40a only in one position. Herein the locking module 86a is in particular configured for locking the seat bottom unit 28a and the backrest unit 40a in the TTL position. The locking module 86a is configured for locking the aircraft seat 10a in the TTL position. In particular, the locking module 86a does not lock the seat bottom unit 28a and the backrest unit 40a in the comfort position. The locking module 86a is configured to lock the aircraft seat 10a exclusively in the TTL position. The locking module 86a does not lock the aircraft seat 10a in the comfort position. The locking module 86a is embodied as a purely mechanical module. Principally it is also conceivable that the locking module 86a could also be embodied as an electro-mechanical or electro-magnetical module. In particular, the locking module 86a does not comprise pneumatic springs. Viewed in a transverse direction, the locking module 86a is arranged laterally on the aircraft seat 10a. Principally it is also conceivable that the locking module 86a is arranged, in a transverse direction, centrally on the aircraft seat 10a. The locking module 86a is configured for a purely mechanical locking of the aircraft seat 10a. The locking module 86a comprises a locking element 88a, which is fixedly connected to the seat bottom unit 28a. The locking element 88a is embodied as a locking bolt. Principally it is also conceivable that the locking element 88a is implemented in a different manner that is deemed expedient by someone skilled in the art like, for example, as a hook element. The locking element 88a is arranged on an underside of the seat bottom unit 28a. The locking module 86a comprises a locking unit 90a. The locking unit 90a is fixedly connected to the mounting unit 14a. The locking unit 90a is herein arranged on a front transverse support 24a. The locking unit 90a is arranged on an upper side of the transverse support 24a. The locking unit 90a is connected to the transverse support 24a via fixation elements. It is herein conceivable that a fixation element is embodied as a clamp. Principally it is also conceivable that the locking unit 90a is connected to the front transverse support 24a via another kind of substance-to-substance bond and/or form-fit connection. By the connection to the front transverse support 24a an especially advantageous force introduction is achievable. Principally it is also conceivable that the locking unit 90a is connected to one of the carrier elements 52a, 54a. For a locking of the locking module 86a, the locking unit 90a is connectable to the locking element 88a in a form-fit manner. The locking unit 90a comprises a housing 92a having a U-shaped cross-section. The housing 92a comprises a recess. The locking unit 90a comprises a pivotable form-fit element 94a. The form-fit element 94a is embodied on one end as a hook. The form-fit element 94a is pivotally connected to the housing 92a via a support unit, which is not shown in detail. The form-fit element 94a is lockable in a locked position. In the locked position the form-fit element 94a is arranged in the housing 92a in such a way that the end of the form-fit element 94a which is embodied as a hook is located in the recess of the housing 92a. The form-fit element 94a herein realizes, together with the housing 92a, a closed region in which the locking element 88a may be arranged. In this way the locking element 88a is connected to the form-fit element 94a in a form-fit fashion. The form-fit element 94a is herein latched in a locked position by means of latch elements (not shown in detail). In a position when the form-fit element 94a is pivoted out of the locked position, the form-fit element 94a is not latched and may be pivoted. The locking module 86a comprises an actuation lever 96a. The actuation lever 96a is configured for releasing the form-fit element 94a out of the locked position. The actuation lever 96a is pivotally supported on the housing 92a. If the locking element 88a is locked in the locking module 86a by means of the form-fit element 94a, it is unlockable by an actuation of the actuation lever 96a. The locking module 86a comprises an actuation element 98a. The actuation element 98a is coupled with the actuation lever 96a for the purpose of operating said actuation lever 96a. The actuation element 98a connects the actuation lever 96a of the locking module 86a to an operating element 132a, which is configured to be actuated by a person. The operating element 132a is herein embodied as a lever that is configured to be pivoted by a passenger. Principally it is also conceivable that the operating element 132a is embodied as a different operating element deemed expedient by someone skilled in the art, for example as a pressure button or as a pull element. The actuation element 98a is embodied as a Bowden cable. Principally it is also conceivable that the actuation element 98a is implemented in a different manner that is deemed expedient by someone skilled in the art, e.g. as a different type of pull element or as a rod arrangement. Principally it is also conceivable that the locking module 86a comprises a spring element exerting a counterforce onto the backrest unit 40a and/or onto the seat bottom unit 28a, which is directed counter to an adjustment of the backrest unit 40a out of the TTL position. Herein the spring element would realize a resistance against a passenger when adjusting the aircraft seat 10a from the TTL position into the comfort position, to prevent a sudden or non-controlled tilting into the comfort position. It is herein conceivable to use a non-linear spring element for the purpose of providing an increased counterforce shortly before reaching the comfort position, to ensure the comfort position being reached softly. In an adjustment from the comfort position back to the TTL position, the counterforce exerted onto the backrest unit 40a by the spring element would support an adjustment. In this way a comfort of the aircraft seat 10a is advantageously increasable. Principally it would also be conceivable that the backrest unit 40a and/or the seat bottom unit 28a could be fixated in further, intermediate positions between the TTL position and the comfort position. Herein, by the spring element that is integrated in the locking module 86a, a holding force could be exerted via which the backrest unit 40a and the seat bottom unit 28a would be fixatable.

The aircraft seat 10a comprises two armrests 100a, 102a. The armrests 100a, 102a are herein respectively mounted on a side of the aircraft seat 10a. The armrests 100a, 102a are directly connected with the backrest unit 40a. For this purpose the backrest unit 40a comprises connection points (not shown in detail) on its sides via which the armrests 100a, 102a are pivotally connectable to the backrest unit 40a. The operating element 132a for an actuation of the locking module 86a by a passenger is arranged in the armrest 102a. The actuation element 98a that is embodied as a Bowden cable is for this purpose guided from the actuation lever 196a until into the armrest 100a, where it is connected to the operating element 132a. For a pivotal support of the armrest 102a, the actuation element 98a that is embodied as a Bowden cable is herein, for example, guided through a central recess in a bearing bolt into an interior of the armrest 102a and up to the operating element 132a.

The aircraft seat device comprises two belt connection elements 104a, 106a. The belt connection elements 104a, 106a are configured to connect a safety belt of the aircraft seat 10a with the mounting unit 14a. Respectively one belt connection element 104a, 106a is arranged on a side of the aircraft seat 10a. The belt connection elements 104a, 106a are respectively connected to the carrier elements 52a, 54a of the aircraft seat 10a. The two belt connection elements 104a, 106a are herein embodied identically, and therefore only the one belt connection element 104a will be described in the following. The belt connection element 104a is connected to the carrier element 52a via the accommodation hole 72a. Herein the belt connection element 104a is connected to the carrier element 52a by means of a fixation element, e.g. a screw or a rivet, in a form-fit manner. On an end facing away from the carrier element 52a, the belt connection element 104a comprises a connection region, via which the safety belt is connected to the belt connection element 104a with one end. Principally it is also conceivable that the belt connection element 104a is arranged in a region underneath the seat bottom unit 28a and/or behind the backrest unit 40a, and the seat bottom unit 28a and/or the backrest unit 40a have/has a through-hole which the safety belt of the aircraft seat 10a is guided through.

If the aircraft seat 10a is in a TTL position, the seat bottom unit 28a and the backrest unit 40a are locked via the locking unit 90a. Forces are introduced into the mounting unit 14a directly from the seat bottom unit 28a via the torsion element 80a and the carrier elements 52a, 54a. The locking unit 90a is unlockable by an actuation of the operating element 132a by the passenger. To bring the aircraft seat 10a into the comfort position, the passenger may tilt the seat bottom unit 28a and the backrest unit 40a rearwards by shifting his weight rearwards toward the backrest unit 40a. Herein the locking unit 90a is released from the locking element 88a. In the comfort position the aircraft seat 10a is not locked. By shifting his weight frontwards, the passenger may pivot the seat bottom unit 28a and the backrest unit 40a back towards a front, as a result of which the locking element 88a re-snaps in the form-fit element 94a of the locking unit 90a and is latched. In this way the aircraft seat 10a is re-latched in its TTL position.

The further aircraft seats 60a, 62a of the seat row 12a, which are respectively arranged on a side of the aircraft seat 10a, each comprise a backrest unit 134a, 136a as well as an armrest 138a, 140a that is connected to the backrest unit 134a, 136a. The aircraft seats 60a, 62a each comprise only one armrest 138a, 140a. The armrests 138a, 140a are herein respectively arranged on a side of the backrest unit 134a, 136a of the aircraft seat 60a, 62a, which side faces away from the aircraft seat 10a. The armrests 100a, 102a of the middle aircraft seat 10a of the seat row 12a are configured for the respectively facing outer aircraft seat 60a, 62a. The armrests 138a, 140a of the aircraft seats 60a, 62a are herein embodied substantially identically to the armrests 100a, 102a of the aircraft seat 10a. By a small distance of the outer aircraft seats 60a, 62a to the middle aircraft seat 10a of the seat row 12a, an advantageously comfortable arm support may be rendered available for a passenger of the outer aircraft seats 60a, 62a despite the armrests 100a, 102a which are also intended for the outer aircraft seats 60a, 62a. Moreover, in an adjustment of one of the aircraft seats 10a, 60a, 62a into a comfort position, the armrest 100a, 102a shared by two neighboring aircraft seats 10a, 60a, 62a may be comfortably used from the neighboring aircraft seat 10a, 60a, 62a that is in a TTL position.

Principally it would also be conceivable that the backrest unit 40a and the seat bottom unit 28a of the aircraft seat 10a are implemented separately from one another. It would herein be conceivable that the backrest unit 40a and the seat bottom unit 28a are directly connected to one another via connection elements or that both the seat bottom unit 28a and the backrest unit 40a are connected to the carrier elements 52a, 54a via corresponding connection elements. Herein it is conceivable that the backrest unit 40a and/or the seat bottom unit 28a are rigidly coupled with the carrier elements 52a, 54a. In the same way it is conceivable that the backrest unit 40a and/or the seat bottom unit 28a, are/is, together or individually, implemented to be pivotal relative to the mounting unit 14a of the aircraft seat 10a via a corresponding support module, for the purpose of realizing a TTL position and a comfort position.

In FIGS. 7 to 13 four further exemplary embodiments of the invention are shown. The following descriptions and the drawings are substantially limited to the differences between the exemplary embodiments, wherein regarding identically designated structural components, in particular regarding structural components with the same reference numerals, the drawings and/or description of the other exemplary embodiments, in particular of FIGS. 1 to 6, may also be referred to. To distinguish between the exemplary embodiments, the letter a has been added to the reference numerals of the exemplary embodiment of FIGS. 1 to 6. In the exemplary embodiments of FIGS. 7 to 13 the letter a has been substituted by the letters b to e.

Figure 7:
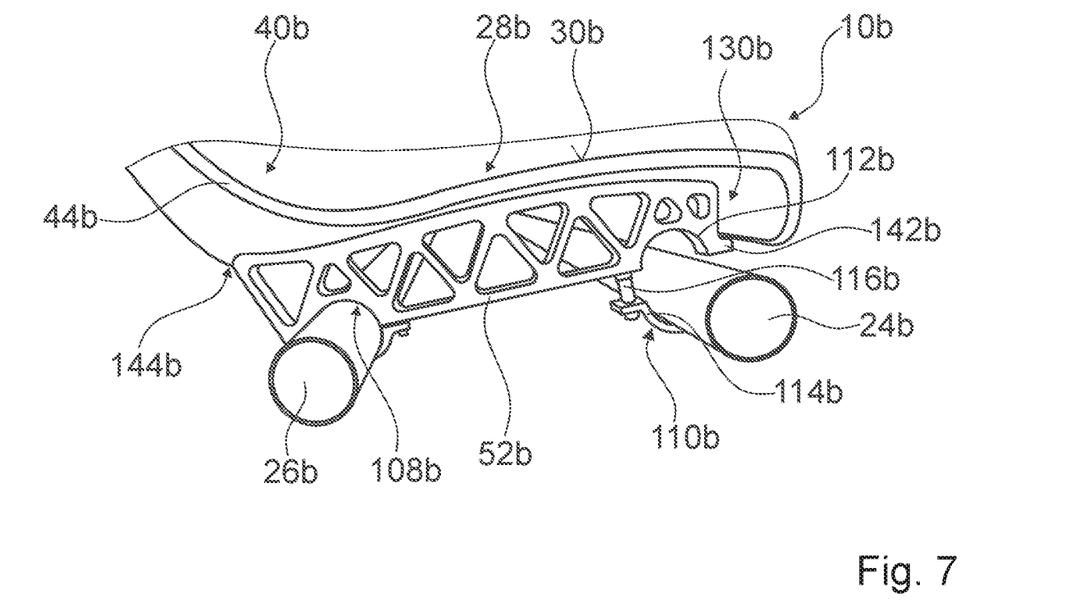
Figure 8:
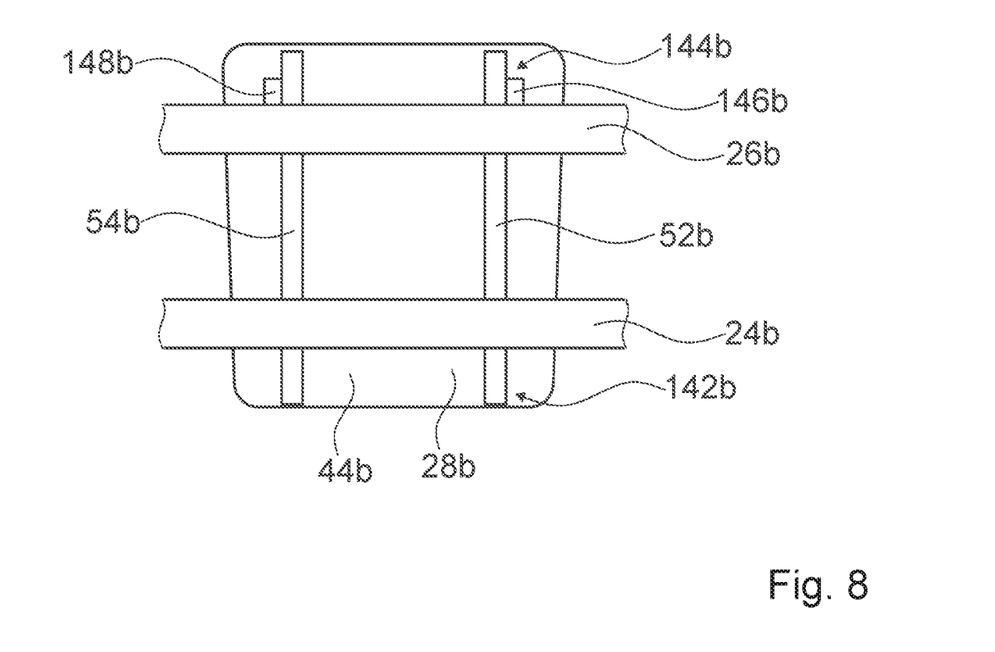
Figure 9:
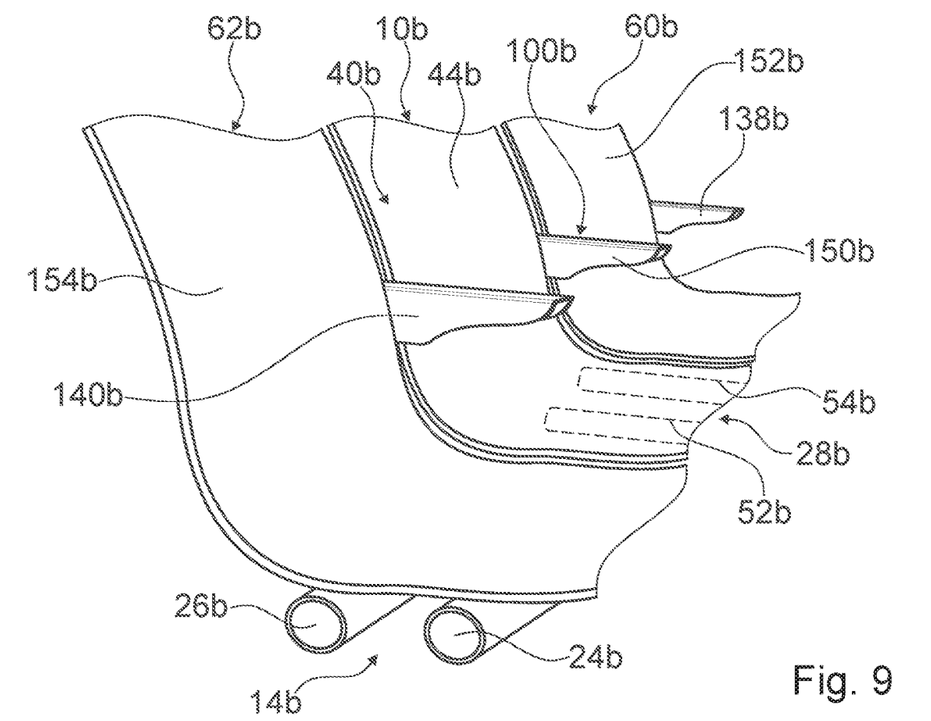

FIGS. 7 to 9 schematically show an aircraft seat device in a second exemplary embodiment. The aircraft seat device is part of an aircraft seat 10b. The aircraft seat 10b is herein part of a seat row 12b that consists of a plurality of aircraft seats 10b, 60b, 62b. The seat row 12b comprises three aircraft seats 10b, 60b, 62b, which are arranged side by side. The aircraft seat 10b is configured to be mounted in an aircraft cabin of an aircraft. The aircraft seat 10b comprises a mounting unit 14b. All aircraft seats 10b, 60b, 62b of the seat row 12b are mounted via the mounting unit 14b. The mounting unit 14b is configured for mounting the aircraft seat 10b on the cabin floor of the aircraft cabin. The mounting unit 14b comprises two transverse supports 24b, 26b. The two transverse supports 24b, 26b are implemented as transverse tubes. The transverse supports 24b, 26b have ring-shaped cross-sections. The first transverse support 24b is herein embodied as a front transverse support 24b. The front transverse support 24b is connected to front seat feet.

Herein the front seat feet are each connected rigidly to the front transverse support 24b. The second transverse support 26b is embodied as a rear transverse support 26b. The rear transverse support 26b is connected to rear seat feet. Herein the rear seat feet are each connected to the rear transverse support 26b in a rigid and torque-proof fashion.

The aircraft seat device comprises a seat bottom unit 28b. The seat bottom unit 28b is configured to implement a seat surface 30b for a passenger. On the seat surface 30b implemented by the seat bottom unit 28b a passenger may sit. The aircraft seat device comprises a backrest unit 40b. The backrest unit 40b is configured to provide a backrest support surface 42b, which a passenger sitting on the aircraft seat 10b may rest his back against. The backrest unit 40b comprises a base body 44b. The base body 44b is implemented of a fiber composite material. Herein the base body 44b comprises a front wall 48b, which is implemented of a plurality of fiber composite layers. It is herein conceivable that the front wall 48b implemented by the base body 44b is embodied of a plurality of different fiber composite layers, like in particular CFRP layers and/or GFRP layers. The seat bottom unit 28b is partially embodied integrally with the backrest unit 40b. The seat bottom unit 28b is implemented by the base body 44b that implements the backrest unit 40b. The seat bottom unit 28b and the backrest unit 40b are together embodied by a shared base body 44b. The shared base body 44b embodies a supporting shell of the aircraft seat 10b. The seat bottom unit 28b and the backrest unit 40b are together mounted on a cabin floor of an aircraft cabin via the mounting unit 14b.

The aircraft seat device comprises a carrier element 52b and a second carrier element 54b, which are allocated to the aircraft seat 10b. The two carrier elements 52b, 54b are configured to couple the seat bottom unit 28b and the backrest unit 40b with the mounting unit 14b. The carrier elements 52b, 54b are arranged underneath the seat bottom unit 28b. The carrier elements 52b, 54b are herein covered toward a top by the seat bottom unit 28b. The carrier elements 52b, 54b do not protrude beyond the seat bottom unit 28b laterally. The carrier elements 52b, 54b are herein embodied as plate-shaped elements. Through-holes (not shown in detail) serving for a weight reduction of the carrier elements 52b, 54b are implemented in the carrier elements 52b, 54b. The carrier elements 52b, 54b extend over a large portion of a seat depth of the seat surface 30b of the seat bottom unit 28b. The carrier elements 52b, 54b are herein arranged spaced apart from one another in a transverse direction. The carrier elements 52b, 54b are directly connected to the seat bottom unit 28b. The carrier elements 52b, 54b are herein directly connected to an underside of the base body 44b. Herein the carrier elements 52b, 54b are rigidly connected to the base body 44b via an adhesive-bond. Principally it is also conceivable that the carrier elements 52b, 54b are, additionally, fixedly connected to the base body 44b by screw connections and/or by other form-fit connections. Principally it is also conceivable that the carrier elements 52b, 54b are laminated onto the base body 44b and/or that the base body 44b is injection-molded over the carrier elements 52b, 54b. This is in particular conceivable if the base body 44b is implemented of a fiber composite material. In a front region 130b the base body 44b and the carrier elements 52b, 54b are adapted to one another in a form-fit manner. Herein a front edge of the base body 44b respectively rests upon a projection 142b of the corresponding carrier element 52b, 54b.

In a rear region 144b the carrier elements 52b, 54b extend slightly upward in a transition zone between the seat bottom unit 28b and the backrest unit 40b, while realizing a lower contour of the base body 44b. In this way an additional form-fit connection has been created between the carrier elements 52b, 54b and the base body 44b. This allows achieving a particularly advantageous force transfer and in particular a fix and secure adhesive-bond between the base body 44b and the carrier elements 52b, 54b. In the rear region 144b the base body 44b comprises respectively one belt connection recess 146b, 148b on exterior sides of the carrier elements 52b, 54b. In an assembled state a safety belt of the aircraft seat 10b is guided through the belt connection recesses 146b, 148b. Via belt connection elements (not shown) the safety belt is herein fixedly connected to the rear transverse support 26b or to the respective carrier element 52b, 54b. The carrier elements 52b, 54b are each connected to the front transverse support 24b and the rear transverse support 26b. The carrier elements 52b, 54b are arranged in such a way that they are pivotable relative to the mounting unit 14b. For this purpose, the carrier elements 52b, 54b are arranged pivotally relative to the rear transverse support 26b. The carrier elements 52b, 54b are herein pivotally supported directly on the rear transverse support 26b. For this the carrier elements 52b, 54b each comprise a bearing accommodation 108b. The bearing accommodation 108b is configured to implement a slide bearing point. It is herein principally conceivable that slide means are additionally arranged in the bearing accommodation 108b. On their front ends the carrier elements 52b, 54b are supported, via bearing points 110b, in such a way that they are movable relative to the front transverse support 24b. The bearing points 110b comprise two semicircle-shaped accommodations 112b, 114b, which are embodied spaced apart from each other. Herein the two accommodations 112b, 114b are spaced apart from each other via spacer elements 116b. The spacer elements 116b are herein embodied as stud screw elements with heads. In a TTL position the front transverse support 24b abuts on the upper accommodation 112b. In the comfort position the front transverse support 24b abuts on the lower accommodation 114b. The carrier elements 52b, 54b herein respectively rotate directly around the rear transverse support 26b. Equivalently to the preceding exemplary embodiment, the aircraft seat device comprises a locking module (not shown in detail), via which the seat bottom unit 28b is lockable in the TTL position. By adapting their height, the carrier elements 52b, 54b may be adapted to different aircraft seats in an especially advantageous manner. On the basis of the carrier elements shown in the present exemplary embodiment, the implementation of the carrier elements 52b, 54b allows providing carrier elements of significantly less height, which may in particular be used in emergency exit seats to achieve a reduced height of the seat bottom unit. A reduced height of the seat bottom unit could herein be compensated by a thickened, removable comfort element.

The aircraft seat 10b comprises an armrest 100b. The armrest 100b is connected to the backrest unit 40b on a first side of the seat bottom unit 28b. The armrest 100b comprises a base support 150b. The base support 150b of the armrest 100b is embodied integrally with the base body 44b of the backrest unit 40b. The armrest 100b is herein at least partly molded to the base body 44b. The base support 150b of the armrest 100b is herein implemented of a fiber composite material. It is herein conceivable that the base support 150b is implemented of a same fiber composite material as the base body 44b. The base support 150b of the armrest 100b and the base body 44b are together produced in a laminating process. Principally it would also be conceivable that the base support 150b is connected to the base body 44b subsequently via substance-to-substance bond, e.g. by adhesive bonding or by a screw connection. The armrest 100b comprises a comfort element, which is not shown in detail. The comfort element is connected to the base support 150b of the armrest 100b. The comfort element herein forms a support surface for a passenger and is implemented of a padded material. Herein the comfort element is connected to the base support 150b in a non-destructively separable manner. This allows an easy replacement of the comfort element. The comfort element is herein connected to the base support 150b via latch elements, which are not shown. Principally it is also conceivable that the comfort element is connected to the base support 150b by substance-to-substance bond or via other form-fit and/or force-fit elements which are deemed expedient by someone skilled in the art. The armrest 100b is connected to the base body 44b in a rigid, immobile manner. The aircraft seat 10b herein comprises only the armrest 100b that is molded to the base body 44b on the one side. Principally it would be conceivable that the aircraft seat 10b comprises another armrest, mounted on the base body 44b on the side opposite of the armrest 100b.

The further aircraft seats 60b, 62b of the seat row 12b, which are arranged on one side of the aircraft seat 10b respectively, are embodied substantially identically to the aircraft seat 10b. The further aircraft seats 60b, 62b each comprise a base body 152b, 154b, which is implemented identically to the base body 44b of the first aircraft seat 10b. The further aircraft seats 60b, 62b also each comprise only one armrest 138b, 140b molded to them. The middle aircraft seat 10b and the outer aircraft seat 60b herein share the armrest 100b implemented by the aircraft seat 10b. On an aisle side of the aisle-side aircraft seat 62b an armrest (not shown in detail) may be realized via a module that is connected to the mounting unit 14b, in particular to the transverse supports 24b, 26b.

Figure 10:
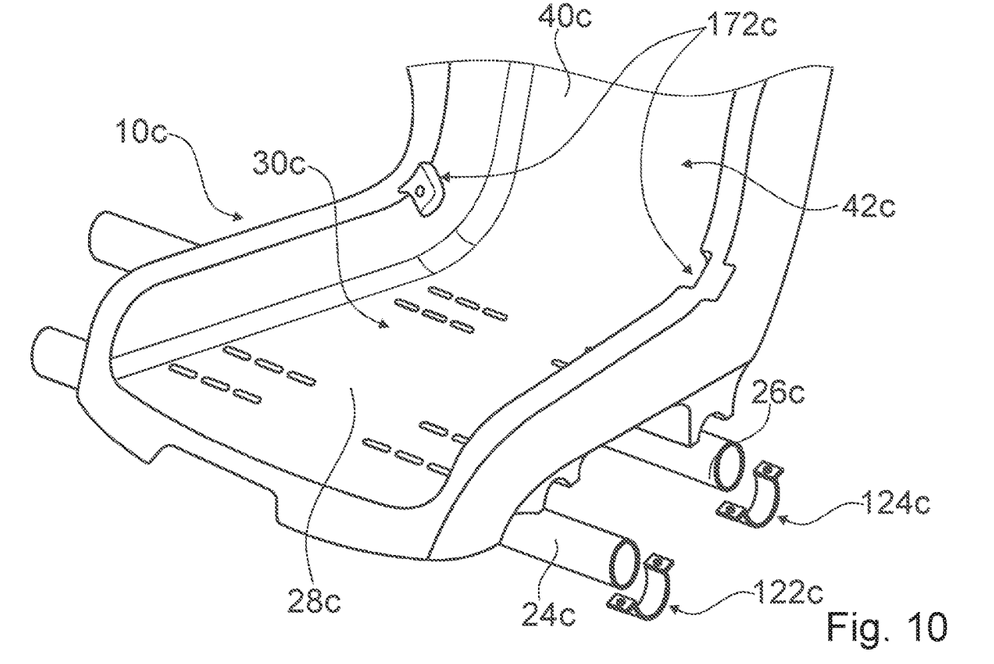
Figure 11:
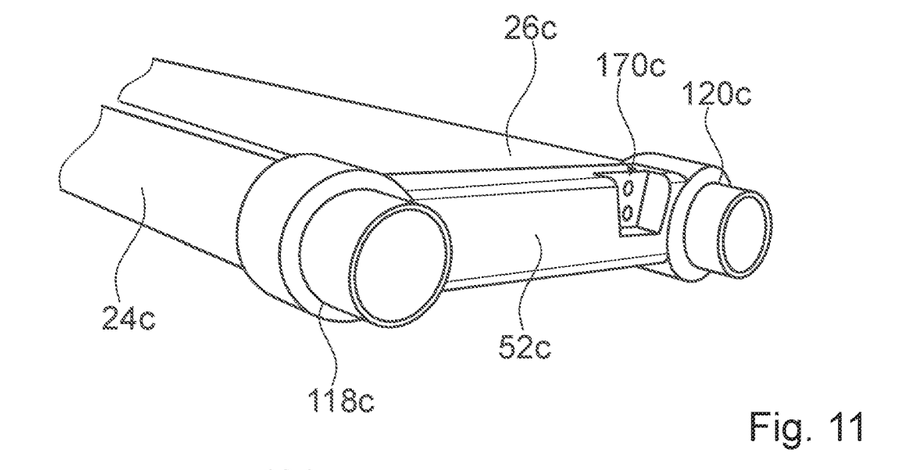
FIG. 11 a schematic representation of a portion of a mounting unit and a carrier element, FIG. 12 a very schematic sectional view of an aircraft seat device, in a fourth exemplary embodiment, with a seat bottom unit and a torsion element that is embodied as a torsion bar, and FIG. 13 a schematic representation of an aircraft seat device according to the invention, in a fifth exemplary embodiment.

FIGS. 10 and 11 show a third exemplary embodiment of the aircraft seat device according to the invention. The aircraft seat device is part of an aircraft seat 10c. The aircraft seat 10c is configured to be mounted in an aircraft cabin of an aircraft. The aircraft seat 10c comprises a mounting unit. The mounting unit is configured for mounting the aircraft seat 10c on the cabin floor of the aircraft cabin. The mounting unit 14c comprises two transverse supports 24c, 26c. The two transverse supports 24c, 26c are embodied as transverse tubes. The aircraft seat device comprises a seat bottom unit 28c. The seat bottom unit 28c is configured to implement a seat surface 30c for a passenger. On the seat surface 30c, which is implemented by the seat bottom unit 28c, a passenger may sit. The aircraft seat device comprises a backrest unit 40c. The backrest unit 40c is configured to provide a backrest support surface 42c, which a passenger sitting on the aircraft seat 10c may rest his back against. The seat bottom unit 28c and the backrest unit 40c are embodied substantially in the same way as the seat bottom unit and the backrest unit of the preceding exemplary embodiments.

The aircraft seat device comprises a carrier element 52c and a second carrier element 54c, which are allocated to the aircraft seat 10c. Like in the second exemplary embodiment, the carrier elements 52c, 54c are connected to the seat bottom unit 28c of the aircraft seat 10c directly and rigidly. Differently from the preceding second exemplary embodiment, the carrier elements 52c, 54c are embodied in such a way that they are not pivotal relative to the mounting unit. The seat bottom unit 28c is thus not pivotable between a TTL position and a comfort position. The carrier elements 52c, 54c comprise an accommodation hole 118c for connecting to the front transverse support 24c, and a further accommodation hole 120c for connecting to the rear transverse support 26c. For a fixation of the carrier elements 52c, 54c, the aircraft seat device comprises for each carrier element 52c, 54c respective clamp elements 122c, 124c, via which the carrier elements 52c, 54c are axially fixated on the transverse supports 24c, 26c. By means of the clamp elements 122c, 124c, the carrier elements 52c, 54c are rigidly fixated on the transverse supports 24c, 26c. FIG. 10 shows possible belt connection points 172c, which are embodied integrally with the seat bottom unit 28c. A safety belt of the aircraft seat 10c could be rigidly connected to the belt connection points 172c. FIG. 11 shows a possible belt connection point 170c, which is implemented by the carrier element 52c. A safety belt of the aircraft seat 10c could be rigidly connected to the belt connection point 170c.

Figure 12:
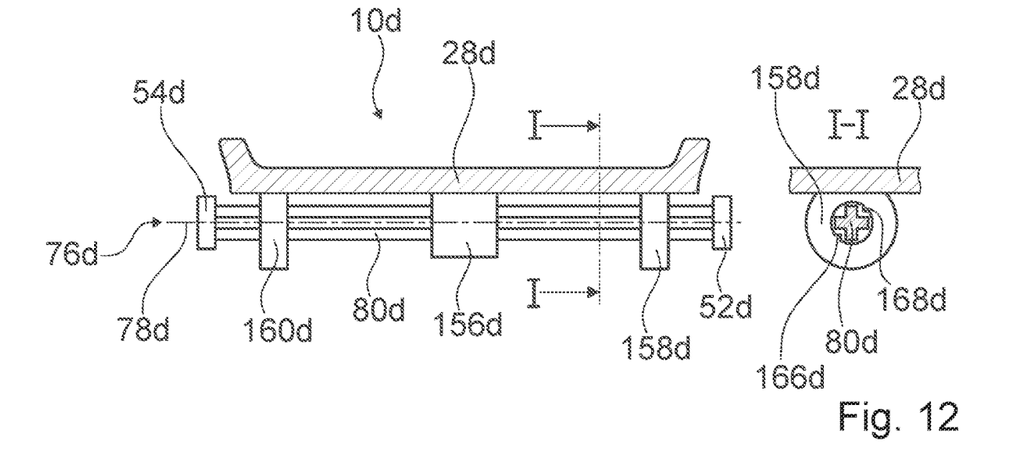

FIG. 12 shows a fourth exemplary embodiment of the aircraft seat device according to the invention. The aircraft seat device is part of an aircraft seat 10d. The aircraft seat 10d is herein embodied substantially in the same way as the corresponding aircraft seat of the first exemplary embodiment and will therefore not be described here in detail. FIG. 12 herein constitutes a very abstract schematic diagram. Additionally FIG. 12 shows a section view I-I.

The aircraft seat 10d is configured to be mounted in an aircraft cabin of an aircraft. The aircraft seat 10d comprises a mounting unit, which is not shown in detail. The aircraft seat device comprises a carrier element 52d and a carrier element 54d, which are allocated to the aircraft seat 10d. The carrier elements 52d, 54d are rigidly connected to the mounting unit.

The aircraft seat 10d comprises a seat bottom unit 28d as well as a backrest unit, which is not shown in detail. The seat bottom unit 28d and the backrest unit are arranged in such a way that they are pivotal relative to the carrier elements 52d, 54d. For a pivotal support of the seat bottom unit 28d and the backrest unit, the aircraft seat device comprises a support module 76d. The support module 76d is embodied as a pivot bearing. The support module 76d implements a pivot axis 78d, via which the seat bottom unit 28d and the backrest unit are pivotal relative to the mounting unit. The pivot axis 78d is herein arranged underneath the seat bottom unit 28d. The pivot axis 78d of the support module 76d is aligned coaxially with a transverse direction of the mounting unit.

The support module 76d comprises a torsion element 80d. The torsion element 80d is embodied as a torsion bar. The torsion element 80d that is embodied as a torsion bar implements the pivot axis 78d. Herein the torsion element 80d that is embodied as a torsion bar is configured to be twisted in a pivoting of the seat bottom unit 28d around the pivot axis 78d. The torsion element 80d, which is embodied as a torsion bar and is shown in a cross-section in the section view I-I, has a cross-shaped cross section. It is principally also conceivable that the torsion element 80d, which is embodied as a torsion bar, has a different cross-section, which is deemed expedient by someone skilled in the art and due to which the torsion element 80d has flexurally rigid and rotationally elastic characteristics. The torsion element 80d is fixedly connected to the carrier elements 52d, 54d on its two ends. The torsion element 80d is herein connected to the carrier elements 52d, 54d in a torque-proof manner via fixation elements (not shown). The torsion element 80d is connected to the carrier elements 52, 54d respectively via a fixed bearing. The torsion element 80d is centrally connected to the seat bottom unit 28d. The torsion element 80d is centrally, in a transverse direction, connected on an underside of the seat bottom unit 28d in a transverse direction. For a connection to the seat bottom unit 28d the support module 76d comprises a bearing element 156d. The bearing element 156d is rigidly connected to the seat bottom unit 28d via suitable fixation elements. Principally it is also conceivable that the bearing element 156a is embodied integrally with the seat bottom unit 28d or is connected to the seat bottom unit 28d by substance-to-substance bond. The bearing element 156d is embodied as a fixed bearing. The torsion element 80d is supported in the bearing element 156d in a torque-proof manner. The support module 76d comprises two further bearing elements 158d, 160d. The further bearing elements 158d, 160d are also mounted on the underside of the seat bottom unit 28d. The bearing elements 158d, 160d are rigidly connected to the seat bottom unit 28d via suitable fixation elements. The two further bearing elements 158d, 160d are embodied as loose bearings. The torsion element 80d is guided in the bearing elements 158d, 160d which are embodied as loose bearings. Herein the torsion element 80d may twist in the bearing elements 158d, 160d. The bearing elements 158d, 160d are herein respectively arranged on a side of the seat bottom unit 28d that faces toward a carrier element 52d, 54d. The support module 76d comprises four stops 166d, 168d. The stops 166d, 168d are configured to restrict a pivoting of the torsion element 80d and thus a pivoting of the seat bottom unit 28d and the backrest unit 40d. When the torsion element 80d abuts on the stops 166d, 168d, the aircraft seat 10d is in its comfort position. The stops 166d, 168d are arranged in the bearing elements 158d, 160d which are embodied as loose bearings. The stops 166d, 168d are herein implemented as elevations on an inner side of bearing recesses in the respective bearing element 158d, 160d. Principally it is also conceivable that the bearing elements 158d, 160d respectively implement only one stop 166d, 168d or a greater number of stops 166d, 168d.

In a TTL position of the seat bottom unit 28d and the backrest unit, the torsion element 80d that is embodied as a torsion bar is in a neutral position. In the neutral position the torsion element 80d is not twisted. If the seat bottom unit 28d is pivoted into a comfort position, the torsion element 80d is taken along via the bearing element 156d, which is connected to the seat bottom unit 28d. As the torsion element 80d is supported, via fixed bearings, in a torque-proof manner relative to the carrier elements 52d, 54d which are arranged rigidly relative to the mounting unit, the torsion element 80d is twisted in itself in a pivoting into the comfort position. When the torsion element 80d abuts on the stops 166d, 168d of the support module 76d, the seat bottom unit 28d is pivoted in the comfort position. The torsion element 80d is herein twisted counter to an inner spring load. Herein the torsion element 80d may rotate freely in the bearing elements 158d, 160d and is thus guided therein. In the comfort position the torsion element 80d is elastically twisted. As a result, the torsion element 80d provides a reset force via which the seat bottom unit 28d may be brought back into the TTL position. For locking the seat bottom unit 28d and the backrest unit, the aircraft seat device comprises a locking module, which is not shown in detail. The locking module is configured for locking the seat bottom unit 28d and the backrest unit in a TTL position. Principally it is also conceivable that the aircraft seat device does not comprise a locking module and the seat bottom unit 28d is sufficiently secured in the TTL position by the flexural rigidity of the torsion element 80d.

Figure 13:
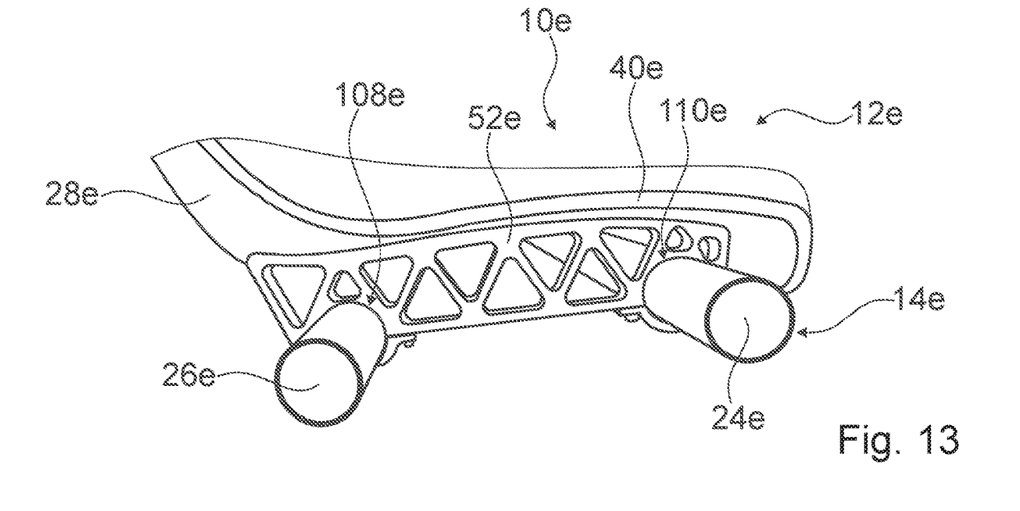

FIG. 13 schematically shows an aircraft seat device in a fifth exemplary embodiment. The aircraft seat device is part of an aircraft seat 10e. The aircraft seat 10e is herein part of a seat row 12e with a plurality of aircraft seats 10e. The seat row 12e comprises three aircraft seats 10e, which are arranged side by side.

The aircraft seat 10e is configured to be mounted in an aircraft cabin of an aircraft. The aircraft seat 10e comprises a mounting unit 14e. All aircraft seats 10e of the seat row 12e are mounted via the mounting unit 14e. The mounting unit 14e comprises two transverse supports 24e, 26e. The two transverse supports 24e, 26e are embodied as transverse tubes. The aircraft seat device comprises a seat bottom unit 28e. The seat bottom unit 28e is configured to implement a seat surface 30e for a passenger. The aircraft seat device comprises a backrest 40e. The aircraft seat 10e and in particular the seat bottom unit 28e and the backrest unit 40e are implemented identically to the second exemplary embodiment of FIGS. 7 to 9. Herein the aircraft seats of the seat row 12e, which are not shown, are also implemented identically to the second exemplary embodiment.

Differently from the second exemplary embodiment, the aircraft seats 10e of the seat row 12e are connected to the mounting unit 14e in a rigid and not in a pivotal fashion. The aircraft seats 10e are capable of realizing only one seat position. The aircraft seats 10e of the seat row 12e are always oriented in a TTL position. For a connection to the mounting unit 14e, the aircraft seat device comprises a first carrier element 52e and a second carrier element (not shown), which are allocated to the aircraft seat 10e. The two carrier elements 52e are configured for coupling the seat bottom unit 28e and the backrest unit 40e with the mounting unit 14e. Herein the carrier elements 52e are rigidly coupled with the mounting unit 14e.

The carrier elements 52e are each connected to the front transverse support 24e and the rear transverse support 26e. The carrier elements 52e are supported directly on the rear transverse support 26e. For this the carrier elements 52e respectively comprise a bearing accommodation 108e. The bearing accommodation 108e is configured to implement a fixed bearing. On their front ends the carrier elements 52e are supported rigidly relative to the front transverse support 24e via bearing accommodations 110e. The bearing accommodations 110e are configured to implement a fixed bearing. By means of the bearing accommodations 108e, 110e the carrier elements 52e are connected to the transverse supports 24e, 26e in a rigid and immobile fashion. The carrier elements 52e are herein fixated axially on the transverse supports 24e, 26e via the bearing accommodations 108e, 110e.

REFERENCE NUMERALS 10 aircraft seat
12 seat row
14 mounting unit
16 seat foot
18 seat foot
20 seat foot
22 seat foot
24 transverse support
26 transverse support
28 seat bottom unit
30 seat surface
32 base body
34 rear wall
36 front wall
38 comfort element
40 backrest unit
42 backrest unit support surface 44 base body
46 rear wall
48 front wall
50 comfort element
52 carrier element
54 carrier element
56 carrier element
58 carrier element
60 aircraft seat
62 aircraft seat
64 connection region
66 connection region
68 upper edge
70 end region
72 accommodation hole
74 upper edge
76 support module
78 pivot axis
80 torsion element
82 bearing accommodation
84 connection element
86 locking module
88 locking element
90 locking unit
92 housing
94 form-fit element
96 actuation lever
98 actuation element
100 armrest
102 armrest
104 belt connection element
106 belt connection element
108 bearing accommodation
110 bearing accommodation
112 accommodation
114 accommodation
116 spacer element
118 accommodation hole
120 accommodation hole
122 clamp element
124 clamp element
130 front region
132 operating element
134 backrest unit
136 backrest unit
138 armrest
140 armrest
142 projection
144 region
146 belt connection recess
148 belt connection recess
150 base support
152 base body
154 base body
156 bearing element
158 bearing element
160 bearing element
162 position
164 step element
166 stop
168 stop
170 belt connection point
172 belt connection point

The invention claimed is:

1. An aircraft seat comprising:
an aircraft seat device, the aircraft seat device includes at least one seat bottom unit that at least partly implements a seat surface; a backrest unit; a mounting unit that is configured to be mounted on a mounting plane and that comprises a front transverse support and a rear transverse support; at least one locking module that is at least in a sitting position configured to lock the seat bottom unit and/or the backrest unit of the aircraft seat device; and at least two carrier elements that each extend at least over a large portion of a seat depth of the seat surface and that are configured to couple the seat bottom unit with the mounting unit, wherein the carrier elements are each connected to the front transverse support and the rear transverse support and are arranged spaced apart from each other in a transverse direction, wherein in at least one seat position the carrier elements each are arranged at least substantially underneath an upper edge of the seat bottom unit.

2. The aircraft seat according to claim 1, wherein the backrest unit is at least partially implemented integrally with the seat bottom unit.

3. The aircraft seat according to claim 2, wherein the aircraft seat device comprises a support module that pivotally couples the at least one carrier element directly with a rear transverse support.

4. The aircraft seat according to claim 1, wherein the seat bottom unit and/or the backrest unit are/is configured to be pivotally connected to the mounting unit.

5. The aircraft seat according to claim 4, wherein the seat bottom unit and/or the backrest unit are supported around a shared pivot point.

6. The aircraft seat according to claim 5, wherein the aircraft seat device comprises at least one support module that is configured to pivot the seat bottom unit and/or the backrest unit relative to the carrier elements, and implement a pivot axis that is arranged underneath the seat bottom unit.

7. The aircraft seat according to claim 4, wherein the aircraft seat device comprises at least one support module that is configured to pivot the seat bottom unit and/or the backrest unit relative to the carrier elements, implementing for this purpose a pivot axis that is arranged underneath the seat bottom unit.

8. The aircraft seat according to claim 7, wherein the support module comprises at least one torsion element, implementing the pivot axis of the aircraft seat and extending over a seat width of the seat bottom unit.

9. The aircraft seat according to claim 1, wherein the locking module comprises at least one locking element that locks the seat bottom unit only in a seat position that is embodied as a TTL position.

10. The aircraft seat according to claim 1, wherein the aircraft seat device comprises a support module that pivotally couples the at least one carrier element directly with a rear transverse support.

11. The aircraft seat according to claim 1, further comprising two armrests, wherein
the armrests are directly connected with the backrest unit.

12. An aircraft seat comprising:
an aircraft seat device, the aircraft seat device includes at least one seat bottom unit that at least partly implements a seat surface; a backrest unit that is at least partially implemented integrally with the seat bottom unit; a mounting unit that is configured to be mounted on a mounting plane; at least one carrier element that extends at least over a large portion of a seat depth of the seat surface and is configured to couple the seat bottom unit with the mounting unit; and at least one locking module that is only in one sitting position configured to lock the seat bottom unit and the backrest unit, wherein the locking module comprises a locking element that is fixedly connected to the seat bottom unit, wherein the locking module comprises a locking unit that is fixedly connected to the mounting unit, wherein for a locking of the locking module, the locking unit is connectable to the locking element in a form-fit manner.

13. An aircraft seat comprising:
an aircraft seat device, the aircraft seat device includes at least one seat bottom unit that at least partly implements a seat surface; a backrest unit; two armrests directly connected with the backrest unit; a mounting unit that is configured to be mounted on a mounting plane and that comprises a front transverse support and a rear transverse support; and at least two carrier elements that each extend at least over a large portion of a seat depth of the seat surface and that are configured to couple the seat bottom unit with the mounting unit, wherein the carrier elements are each connected to the front transverse support and the rear transverse support and are arranged spaced apart from each other in a transverse direction, wherein in at least one seat position the carrier elements each are arranged at least substantially underneath an upper edge of the seat bottom unit.

* * * * *